United States Patent

[11] 3,549,862

[72] Inventors Calvin J. Holtkamp
 Mansfield, Ohio;
 George W. Nagel, Pittsburgh, Pa.
[21] Appl. No. 773,539
[22] Filed Nov. 5, 1968
[45] Patented Dec. 22, 1970
[73] Assignee Westinghouse Electric Corporation
 Pittsburgh, Pa.
 a corporation of Pennsylvania

[54] HEAT CLEANING COOKING OVEN AND CONTROL ARRANGEMENT
 9 Claims, 2 Drawing Figs.
[52] U.S. Cl..................................................... 219/482,
 219/412, 219/413, 219/519
[51] Int. Cl...................................................... H05b 1/02
[50] Field of Search............................................ 219/412,
 413, 482, 490, 491, 492, 519, 397

[56] References Cited
 UNITED STATES PATENTS

| | | | |
|---|---|---|---|
| 3,121,158 | 2/1964 | Hurko ............................ | 219/397 |
| 3,125,659 | 3/1964 | Welch ............................ | 219/412 |
| 3,462,584 | 8/1969 | Guy................................ | 219/413 |

*Primary Examiner*—Bernard A. Gilheany
*Assistant Examiner*—F. E. Bell
*Attorneys*—F. H. Henson and E. C. Arenz ABSTRACT: The oven is provided with a circuit and control arrangement which operates so that the oven is heated to a predetermined high temperature in the heat cleaning range and then further heating is stopped. Relay switching means in a temperature controller circuit is used both for completing a circuit to the oven heating means, and also for completing a holding circuit which is opened when the high temperature is reached. Thus upon a resultant fall in oven temperature the holding circuit remains open to prevent reenergization of the oven heating means through the temperature controller circuit.

| | P L2 | L2 C | L3 T | T N | L3 S | L3 X | X O | A H | B L1 | L1 M |
|---|---|---|---|---|---|---|---|---|---|---|
| OFF | — | — | — | — | — | — | — | — | — | — |
| BAKE | X | — | — | X | — | X | — | — | X | — |
| T BAKE | X | — | — | — | — | — | X | — | X | — |
| LATCH | — | X | — | — | — | X | — | X | — | — |
| CLEAN | X | — | — | — | X | — | — | X | — | — |
| BROIL | X | — | X | — | — | X | — | — | — | — |
| S BROIL | X | — | X | — | — | X | — | — | — | X |

WITNESSES
Theodore F. Wrobel
James F. Young

INVENTORS
Calvin J. Holtkamp
and George W. Nagel
BY Edward C. Arey
ATTORNEY

HEAT CLEANING COOKING OVEN AND CONTROL ARRANGEMENT

BACKGROUND OF THE INVENTION

1. Field of the Invention

This invention pertains to the art of heat cleaning cooking ovens and controls therefor.

2. Description of the Prior Art

It is known in the heat cleaning oven art to provide an oven with a control arrangement in which the oven is heated up to a predetermined temperature in a cleaning temperature range and heating is then stopped, as evidenced by U.S. Pat. Nos. 3,116,398 and 3,121,158, for example. In other words, the oven heating means is not cycled to produce an average temperature of the oven at which the thermostat is set for an extended period of time, but rather the oven heating means is energized only so long as it takes to reach the setting of the thermostat, and heating is then terminated.

Our invention provides a heat cleaning operation of this general character in which advantage is taken of the operational characteristics of certain of the components desirably used in a heat cleaning oven by incorporating them in a particular circuit arrangement.

SUMMARY OF THE INVENTION

In accordance with the invention, a heat cleaning oven is provided which includes an oven cavity having oven heating means therein and a door for closing the cavity, and temperature controller circuit having relay switch means for controlling the energization of said heating means in accordance with oven temperatures sensed by said controller in normal cooking operations. Circuit means is provided for accomplishing the initial energization of the temperature controller circuit and for transferring the energization of the temperature controller circuit to a holding branch circuit, the initial energization of the temperature controller circuit effecting the initial closure of relay switch means which is held closed by the energization of the branch circuit. A temperature controller bypass circuit is included which has a switch operated by selector switch means to a closed position to bypass control of the relay switch means by the temperature controller so that the relay switch means is closed while the temperature control circuit is energized, irrespective of the satisfaction of the temperature controller. A heat cleaning termination switch is provided in the energizing circuit and is responsive to a predetermined maximum heat cleaning temperature during the cycle to open the energizing circuit and thereby effect opening of the relay switch means to deenergize the heating means and the holding branch so that subsequent closure of the heat cleaning termination switch in response to a falling oven temperature is incapable of reenergizing the temperature controller because of the open condition of the relay switch means in the holding branch.

It is noted that the temperature controller itself, as distinct from the relay switch means which it controls during normal cooking operations, and as distinct from the temperature controller circuit through which the temperature controller is energized in operation other than heat cleaning, is unnecessary for control during the heat cleaning cycle. That is, the temperature controller itself is not a necessary element for operation and control in a heat cleaning cycle, even though the circuit used for normally energizing it, and the relay switch means it normally controls in cooking are used in the heat cleaning operation.

The circuit is also arranged so that it requires the operation of door latching means to a latch position, and operation of the selector switch from a latch to a clean position, to proceed with a heat cleaning cycle.

DRAWING DESCRIPTION

CURRENTLY PREFERRED EMBODIMENT OF THE INVENTION

Figures 1, 2:
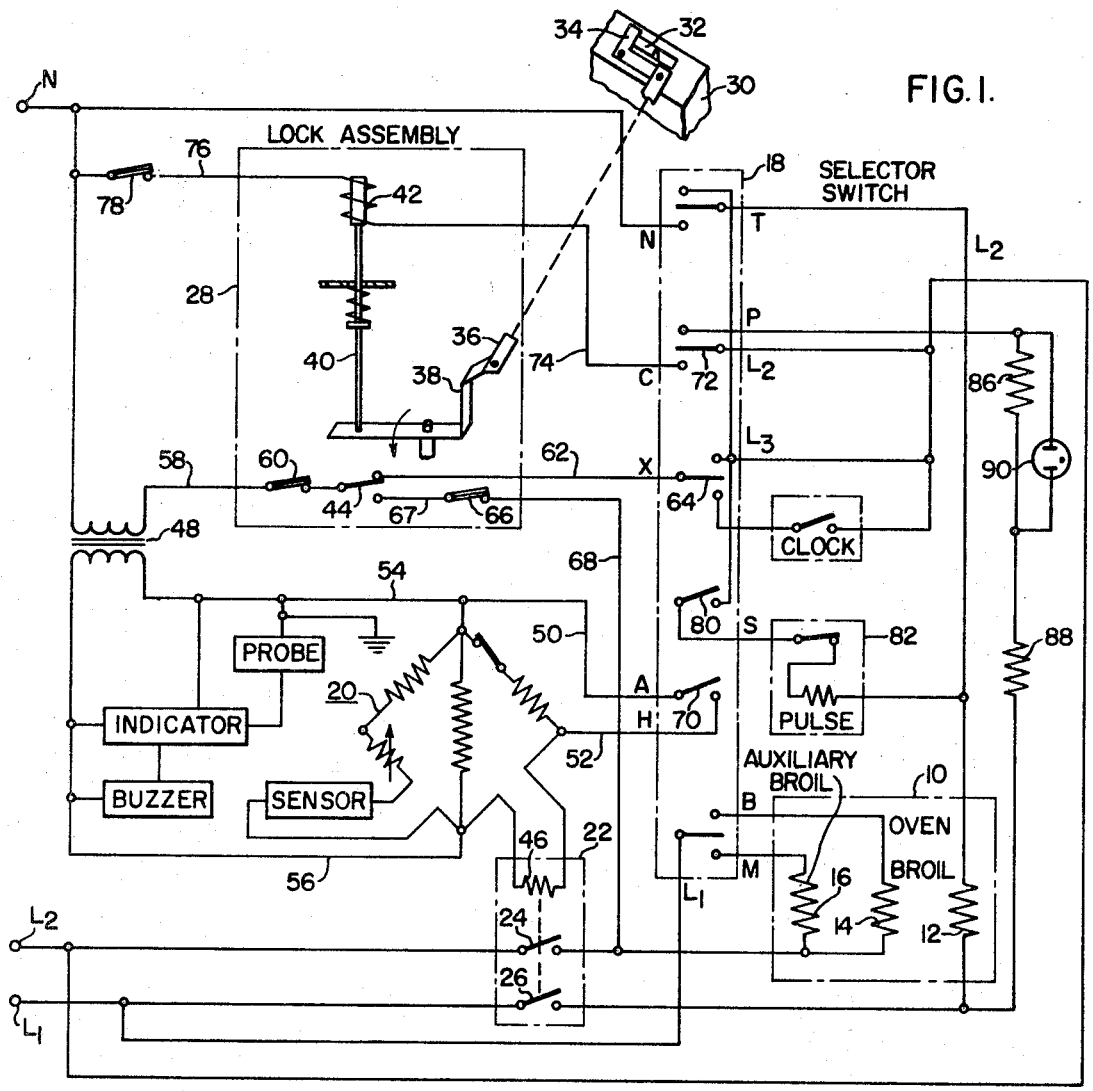
FIG. 1 is a partly-diagrammatic and schematic view of an electrical circuit arrangement for an oven according to the invention.
FIG. 2 is a chart which identifies which contacts of the selector switch means are closed for particular settings of the selector switch means.

In FIG. 1 the oven cavity is generally indicated by the dash-line rectangle 10. Not all parts which are physically located in the cavity are shown therein, but rather only the oven heating means is so shown and includes a broil heater 12 which is also energized during the heat cleaning cycle, a bake heater 14, and an auxiliary broil heater 16 which is used in conjunction with the regular broil heater to obtain simultaneous broiling of the opposite faces of the food article.

The oven selector switch means is settable from an "off" position to obtain a selected operational cycle and is indicated by the dash-line rectangle 18. It includes a plurality of fixed and movable contacts by which connections are made to energize various circuits of the control arrangement. The fourteen external terminals of the selector switch are identified by letter references in FIG. 1 which correspond to the letter references across the top of the table of FIG. 2.

The temperature controller 20 for the oven is of bridge character and includes an auxiliary relay 22 in one leg having relay switch means 24 and 26 normally controlled in accordance with the operation of the temperature controller 20.

Since it is common practice in connection with heat cleaning ovens to provide means to insure that the oven door is latched shut before a heat cleaning cycle is initiated, and is in a condition to permit locking of the door as the temperature in the oven rises into the heat cleaning range, a lock assembly 28 represented by the dash-line rectangle 28 and controlled in part by the operation of a latch handle on the oven door is diagrammatically illustrated.

The arrangement by which the latching occurs and places the arrangement in a condition for locking is of the same general character as disclosed in Nagel patent application Ser. No. 545,967. As diagrammatically illustrated in FIG. 1, the oven door 30 carries a latch handle which includes a latching bolt 32 which is turned up out of the top edge of the door after the door is closed. The bolt rotates a bell crank 34 to transmit a forward pull through link 36 to one end of a lock bar 38. The lock bar pivots as indicated to move the portion of it underlying locking pin 40 out of the way so that the pin can drop when the solenoid 40 or other electroresponsive means is deenergized. When the pin drops it blocks return movement of the locking bar and also moves transfer switch 44 from one position to another.

The description will proceed without attention being given to certain parts which are shown in the circuit arrangement of FIG. 1. For details of the operation and structure of some of those parts, reference should be had to the following commonly assigned U.S. Pat. applications Kastovich Ser. No. 552,663, filed April 26, 1966, now U.S. Pat. No. 3,504,161, relating to the manner in which heat is applied to the oven for a high temperature, quick cleaning cycle; Holtkamp Ser. No. 531,858, filed March 4, 1966, now U.S. Pat. No. 3,440,402, relating to the pulsing of the oven heating means; Nagel Ser. No. 545,967, filed April 28, 1966, now U.S. Pat. No. 3,390,909, relating to the door latching and locking means; and Holtkamp Ser. No. 545,894, filed April 28, 1966, now U.S. Pat. No. 3,387,874, relating to a preferred linking arrangement between the latch and lock means.

The source of electrical power for the oven and control system may be a conventional three line source in which a nominal 240 volt alternating potential exists between the power connections denoted L1 and L2, and with 120 volts alternating potential between these hot lines and the neutral designated N.

The temperature controller 20 is of the general type described in Baker U.S. Pat. No. 2,962,575 and typically in a cooking operation it operates to energize and deenergize the auxiliary relay 22 in accordance with whether the sensed temperature in the oven is below or above the temperature to which the temperature controller is set. Upon energization of the relay thermal (i.e. hot wire) actuating means 46 the switches 24 and 26 close. Upon deenergization, the hot wires cool and gradually permit the switches to open. The delay in opening of the switches after relay deenergization gives time for the holding circuit to be established while the switch means closed.

The temperature controller 20 is connected in a temperature controller circuit which includes the secondary of a transformer 48. For normal cooking operations, as indicated by the table of FIG. 2, the temperature controller bypass circuit comprising lines 50 and 52 leading to the A and H terminals of the selector switch is deenergized. During these cooking operations the temperature controller is energized through the temperature controller circuit including lines 54 and 56 connected to the secondary of the transformer and to the temperature controller. This temperature controller circuit is usually a low voltage circuit of 11 volts, for example, although it need not be for the purposes of this invention.

An energizing circuit for the transformer 48, and accordingly for the temperature control circuit, includes the transformer primary, connected to neutral, and a common portion comprising a line 58, a heat cleaning termination switch 60 which is set to some predetermined maximum heat cleaning temperature at which it is desired that the cleaning cycle terminate, and the transfer switch 44, as noted, is controlled by the latched or unlatched condition of the door, and has one position as illustrated connecting the common portion of the energizing circuit to an energizing branch, and an opposite position connecting the common portion of the energizing circuit to the holding branch. The energizing branch includes the line 62 and a first switch 64 of the selector switch means 18 which, when closed, connects the X terminal of the selector switch to the power side $L_3$. The holding branch of the energizing circuit includes an overheat safety switch 66 connected by line 67 to the transfer switch 44 and line 68 connected to switch 24 of the auxiliary relay.

In a normal baking operation the temperature controller circuit is energized through the transformer 48 which applies a low voltage to the upper and lower corners (as seen in FIG. 1) of the bridge so that energization of the hot wire relay element 46 is in accordance with the difference between the oven temperature and the sensing of the bridge. For a heat cleaning operation, the temperature controller is bypassed or disabled by closure of a second switch 70 of the selector switch means 18 to complete the temperature controller bypass circuit including the lines 50 and 52 and the second switch 70. This shorts out the side of the bridge which includes the internal switch which normally opens and closes in accordance with the differential between the sensed temperature of the temperature controller and the oven temperature. Thus, the low voltage is applied directly across the thermal relay elements 46 so that the switch means 24 and 26 are maintained in the closed position.

A third switch 72 in the selector switch means 18 has a closed position only when the selector switch means is in its latch position. This completes a circuit from the power side $L_2$ to neutral through the third switch 72, line 74 to the solenoid 42, line 76 to the series-connected lock switch 78 which is normally closed and opens at oven temperatures in excess of the normal maximum cooking temperature, such as 550 or 600°F.

A fourth switch 80 in the selector switch means is closed only when the selector switch is set to its clean position and connects the power terminal L, through the closed switch 80 to terminal S and a pulse switch 82 and line 84 to the broil heater 12 which is utilized to provide the heat for the heat cleaning cycle of the oven.

The manner in which the oven is operated to carry out a heat cleaning cycle is as follows. Assume the oven door 30 is closed but not latched. The selector switch means 18 is turned from an off position to a latch position. This closes the first, second and third switches 64, 70 and 72 respectively of the selector switch means. With switch 64 closed, the energizing branch and the common portion of the energizing circuit is completed to energize the primary of the transformer 48. The closure of the second switch 70 results in the temperature controller bypass circuit being completed so that the voltage applied to the hot wire relay element 46 results in the relay switch means 22 being energized to close the switches 24 and 26. The switch 26 is in the heater circuit to the broil element 12. However this circuit is not complete at this time because the fourth switch 80 in the selector switch means is open. The switch 24 of the relay switch means completes a part of the holding branch of the energizing circuit. The closure of the third switch 72 of the selector switch means results in energization of the solenoid 42 and the picking up of the locking pin 40. In the preferred embodiment illustrated, the solenoid 42 emits a buzzing noise which indicates to the user of the oven that the latch means may now be manipulated to a latch position. In so doing, the lock bar is moved out of the way of the solenoid pin 40 so that when the solenoid is subsequently deenergized the pin can drop and will move transfer switch 44 from its illustrated position to its alternate position in which it will complete the energizing circuit to the holding branch. The deenergization of the solenoid takes place after the latching of the door and when the user turns the selector switch means from a latch to a clean position. In so doing, the third switch 72 is opened to deenergize the solenoid, the second switch 70 in the temperature controller bypass circuit remains closed, the first switch 64 of the selector switch means is opened, and the fourth switch 80 of the selector switch means is closed to complete the heater circuit. Thus, after the selector switch means has been operated to the clean position, the primary of the transformer 48 remains energized through the holding branch of the energizing circuit. The temperature controller circuit is energized from the secondary of the transformer, and the temperature controller bypass circuit remains closed so that the switches 24 and 26 are also closed. As a result the oven temperature increases through the energization of the heater 12.

As the oven temperature rises above the normal cooking temperature, the door lock switch 78 opens. This prevents reenergization of the solenoid 42 through operation of the selector switch means from a clean to a latch position. The door lock switch 78 remains open until the cleaning cycle has been stopped and the oven temperature drops into the upper part of the normal cooking temperature range.

When the maximum heat cleaning temperature to which the clean thermostat 60 has been set is reached, the normally closed thermostat 60 opens. The preferred temperature to which the thermostat 60 is set, to provide satisfactory operation from a practical standpoint, is above 1000° F. and preferably in the range of 1050° F. to at least 1100°F.

When the clean thermostat switch 60 opens, the energizing circuit for the transformer 48 and accordingly to the temperature controller circuit is opened. The loss of power through the temperature controller circuit and through the temperature controller bypass circuit results in deenergization of the relay switch means so that both switches 24 and 26 will, after a short cooling delay, open. Opening switch 26 results in deenergization of the heater circuit and the heater 12. Opening switch 24 prevents reenergization of the temperature controller circuit through the temperature controller through the temperature controller energizing circuit when the clean thermostat 60 again closes in response to falling oven temperatures. As the oven temperature falls to a point that the door lock switch 78 closes in response thereto, the latch means may now be operated from a latched to an unlatched position, since the solenoid 42 may now be energized by turning the selector switch means back to a latch position from a clean position. It will be appreciated that during the period the door lock switch 78 is open so that the solenoid may not be energized, the locking pin 40 is also in a position which physically obstructs the locking bar from moving back to a position corresponding to an unlatched position of the door. Thus during the high temperature cleaning period, the door is locked, as distinguished from being merely latched.

The overheat safety switch 66 in the holding circuit is physically located outside the oven cavity and is set to a relatively low temperature with respect to the interior oven cavity temperature. It is normally closed, and is provided for opening the holding branch in case the exterior temperature which it senses rises above a level which is considered safe at that location.

The clean cycle may be terminated at any time after it has started by turning the selector switch means back from a clean position to a latch position. If the oven temperature has not reached a level at which the door lock switch 78 has opened, the solenoid will be energized and emit an audible signal indicating to the user that the latch means may be manually operated to an open position and the selector switch then set to "off". If the temperature in the oven has risen above that temperature at which the door lock switch 78 opens, setting of the selector switch to the latch position will not result in the solenoid being energized. This will prevent the user from unlatching the door at this time. However after the oven temperature has dropped to a level at which the door lock switch 78 closes, the solenoid will then emit the signal indicating the user that the door may now be unlatched and the selector switch turned to an off position.

The particular selector switch means preferred for various reasons has a practical limit of 14 terminals with certain internal connections as shown being possible. In the circuit arrangement illustrated, it is considered that the selector switch means is being used to the maximum of its capability.

In the arrangement shown, there is no requirement for the presence of a door lock light which is typically included in a heat cleaning oven arrangement to show when the door is locked. This requirement is fulfilled by the provision of the solenoid which emits an audible signal to indicate when the oven door can be opened.

The oven pilot light shown in the arrangement is connected in a voltage divider formed by two resistors 86 and 88 of about 33,000 ohms resistance. The 125 volt oven pilot 90 is designed to definitely be deenergized in the off position of the selector switch means as indicated by the table in FIG. 2. This is done to insure its being deenergized whenever the clean cycle is turned off during the heating period, it being noted that if this occurs the relay switch means will remain closed, although the oven heating means is deenergized, until the door is unlatched.

The energization of the different portions of the circuit in the various settings of the selector switch, other than in the latch and clean positions thereof which have been described in some detail, may be determined from the table of FIG. 2. Their disclosure is considered pertinent in the respect of providing for all of the desired oven operations in an arrangement which is compatible with the operation of the oven in a heat cleaning cycle.

We claim:

1. In a heat cleaning oven including an oven cavity with oven heating means therein and a door for closing said cavity, and having a temperature controller circuit having relay switch means for controlling energization of said heating means in accordance with oven temperatures sensed by said controller in normal cooking operations:

a heater circuit including said heating means and said relay switch means;

energizing circuit means for said temperature controller circuit including a common portion and an energizing branch and a holding branch, said energizing branch including first switch means operable to a closed position for initially energizing said temperature controller circuit to effect initial closure of said relay switch means, said holding branch including said relay switch means for maintaining energization of said temperature controller circuit when said holding branch is energized, and a transfer switch for shifting the connection of said common portion from said energizing branch to said holding branch;

a temperature-controller-bypass circuit including second switch means operable to a closed position to bypass control by said temperature controller upon said relay switch means so that said relay switch means is closed while said temperature control circuit is energized, irrespective of the satisfaction of said temperature controller;

a heat-cleaning-termination switch in said energizing circuit responsive to a predetermined maximum heat cleaning temperature during said cycle to open said energizing circuit and thereby effect opening of said relay switch means and deenergize said heating means and said holding branch, whereby subsequent closure of said heat-cleaning-termination switch in response to a falling oven temperature is incapable of reenergizing said temperature controller because of the open condition of said relay switch means in said holding branch.

2. In an oven according to claim 1: latching means for said oven door; and means preventing operation of said transfer switch from a position connecting said common portion of said energizing branch to a position connecting said common portion to said holding branch until said latching means is in a latched condition.

3. In an oven according to claim 1:

selector switch means having a latch position and a clean position;

said selector switch means includes said first switch means having closed and open positions corresponding to said latch position and clean position of said selector switch means respectively; and said selector switch means further includes said second switch means having a closed position in both said latch and clean positions of said selector switch means.

4. In an oven according to claim 1:

normally closed overheat safety switch means in the energized portion of said temperature controller energizing circuit means when said holding branch is energized, said safety switch means being operative to an open position to deenergize said holding branch and thereby terminate heating in response to an overheat condition 5. In an oven according to claim 3:

a latch and lock effecting circuit including electroresponsive means having an energized position permitting operation of said latch means between a latched and an unlatched position; and a series-connected third switch controlled by said selector switch means and having a closed position when said selector switch means is in a latch position for energizing said electroresponsive means to permit operation of said latch means to a latch position, said latch and lock effecting circuit further including a series-connected lock switch having a normally closed position and operable to an open position in response to oven temperatures above the normal maximum cooking temperatures so that said electroresponsive means is precluded from energization during heat cleaning.

6. In an oven according to claim 3:

said selector switch means includes fourth switch means having open and closed positions corresponding to said latch and clean position of said selector switch switch means, respectively; and said fourth switch means is series connected in said heater circuit.

7. In a heat cleaning oven including an oven cavity with oven heating means therein, an oven door and latch means therefor, and having a temperature controller circuit having relay switch means for controlling energization of said heating means in accordance with oven temperatures normally sensed by said controller in normal cooking operations;

energizing circuit means for controlling energization of said temperature controller circuit including an energizing branch having a first switch means operable to a closed position for effecting said energization of said temperature controller circuit initially, and further including a holding branch having said relay switch means therein for maintaining said energization of said temperature controller circuit when the first switch is opened;

a temperature-controller-bypass circuit including second switch means operable to a closed position to bypass said temperature controller;

a heat-cleaning-termination switch in said energizing circuit means responsive to a predetermined maximum heat cleaning temperature to open and thereby deenergize said temperature controller circuit; and transfer switch means in said energizing circuit means operable to a position for deenergizing said energizing branch and for energizing said holding branch in accordance with said latch means being in a position to effect locking of said oven door and said heating means being energized.

8. In an oven according to claim 7:

multicontact selector switch means having a latch position and a clean position;

said selector switch means includes said first switch having a closed position when said selector switch means is in a latch position, and an open position when said selector switch means is in a clean position; and said selector switch means includes said second switch having a closed position in both said latch and clean positions of said selector switch means.

9. In a heat cleaning oven including an oven cavity with oven heating means therein, an oven door and latch means therefor, and having a temperature controller circuit having time delay type relay switch means for controlling energization of said heating means in accordance with oven temperature normally sensed by said controller in normal cooking operations;

energizing circuit means for controlling energization of said temperature controller circuit including an energizing branch having a manually operable first switch operable to a closed position to complete said energizing circuit means for effecting initial energization of said temperature controller circuit;

said energizing circuit means including a holding branch including said relay switch means for maintaining energization of said temperature controller circuit through completion of said energizing circuit means independently of the position of said first switch in said energizing branch;

a temperature-controller-bypass circuit including a second switch operable to a closed position simultaneously with operation of said first switch to a closed position to bypass control of said relay switch means by said temperature controller so that energization of said temperature controller circuit alone causes closure of said relay switch means;

a heat-cleaning-termination switch in said energizing circuit operable to an open position in response to a predetermined maximum heat cleaning temperature to effect deenergization of said temperature controller circuit and thereby deenergize said heating means through opening of said relay switch means; and a transfer switch in said energizing circuit operable to a position deenergizing said energizing branch and energizing said holding branch when said door latch means is in a latch position, and simultaneously with the opening of said first switch.